United States Patent
Schwenk et al.

(10) Patent No.: US 12,072,940 B2
(45) Date of Patent: Aug. 27, 2024

(54) SYSTEMS AND METHODS FOR SIMULTANEOUSLY VIEWING AND MODIFYING MULTIPLE SEGMENTS OF ONE OR MORE FILES

(71) Applicant: UltraEdit, Inc., Austin, TX (US)

(72) Inventors: Benjamin Lee Schwenk, West Chester, OH (US); Áron Pongó, Bratislava (SK)

(73) Assignee: ULTRAEDIT, INC., Austin, TX (US)

( * ) Notice: Subject to any disclaimer, the term of this patent is extended or adjusted under 35 U.S.C. 154(b) by 0 days.

(21) Appl. No.: 18/109,709

(22) Filed: Feb. 14, 2023

(65) Prior Publication Data

US 2023/0334098 A1     Oct. 19, 2023

Related U.S. Application Data

(60) Provisional application No. 63/331,653, filed on Apr. 15, 2022.

(51) Int. Cl.
| | | |
|---|---|---|
| *G06F 16/90* | (2019.01) | |
| *G06F 16/14* | (2019.01) | |
| *G06F 16/903* | (2019.01) | |
| *G06F 16/906* | (2019.01) | |

(52) U.S. Cl.
CPC ...... *G06F 16/90344* (2019.01); *G06F 16/148* (2019.01); *G06F 16/906* (2019.01)

(58) Field of Classification Search
CPC ............ G06F 16/90344; G06F 16/148; G06F 16/906; G06F 16/90
See application file for complete search history.

(56) References Cited

U.S. PATENT DOCUMENTS

| | | | | |
|---|---|---|---|---|
| 9,484,954 | B1 * | 11/2016 | Gopal | H03M 7/4037 |
| 2013/0007223 | A1 * | 1/2013 | Luby | H04N 21/234327 |
| | | | | 709/219 |
| 2014/0229484 | A1 * | 8/2014 | Kataoka | G06F 16/148 |
| | | | | 707/737 |
| 2015/0215359 | A1 * | 7/2015 | Bao | H04L 65/80 |
| | | | | 709/219 |

* cited by examiner

*Primary Examiner* — Merilyn P Nguyen
(74) *Attorney, Agent, or Firm* — Foley & Lardner LLP

(57) ABSTRACT

A method for multi-segment display comprising searching, by a processor, a string of characters in one or more files; responsive to identifying the string in a subset of files of the one or more files, defining, by the processor, one or more file segments based on a byte position of the string in each of the files of the subset of files; and displaying, by the processor, at least one file segment to a user, the displayed file segment being readable and writable.

18 Claims, 9 Drawing Sheets

```
class FileSegment
{
    int64_t fileStart, fileEnd;
    std::vector<wchar_t> text;
    bool modified;
};
```

```
void FileDocument::Flush()
{
    int64_t delta = 0;
    for (FileSegment& seg : segments) {
        seg.fileStart += delta; seg.fileEnd += delta;
        if (seg.modified) {
            seg.modified = false;
            const std::vector<uint8_t> nativeText =
                ConvertUnicodeToNative(seg.text, codePage);
            WriteToFile(seg.fileStart, seg.fileEnd, nativeText);
            delta += (int64_t)nativeText.size() - (seg.fileEnd - seg.fileStart);
            seg.fileEnd = seg.fileStart + nativeText.size();
        }
    }
}
```

FIG. 9

SYSTEMS AND METHODS FOR SIMULTANEOUSLY VIEWING AND MODIFYING MULTIPLE SEGMENTS OF ONE OR MORE FILES

CROSS-REFERENCE TO RELATED APPLICATION

This application claims priority to U.S. Application No. 63/331,653, entitled "SYSTEMS AND METHODS FOR SIMULTANEOUSLY VIEWING AND MODIFYING MULTIPLE SEGMENTS OF ONE OR MORE FILES," filed Apr. 15, 2022, the full disclosure of which is incorporated herein by reference in its entirety.

BACKGROUND

Files are objects stored in a computer that may be written to and/or read by the computer. Files may contain any type of content (e.g., plain text, binary data). A file may include lines of content represented as characters (strings, arrays, etc.), where the content (including lines of content and/or rows of content) is indicated in the file according to a bit (or byte) position. Generally, a computer stores many files in local memory and/or remote memory. As memory capacity increases, computers may store more files. Similarly, as networks become more connected, computers across various networks may access more stored files. Thus, there is a need to simultaneously open (e.g., read, display, view) and modify (e.g., write) portions (also referred to herein as "segments") of one or more files efficiently.

SUMMARY

The example arrangements disclosed herein are directed to solving the issues related to improving computer resources of a system by loading, viewing, and/or modifying file segments of one or more files. Loading, viewing, and/or modifying file segments of one or more files consumes fewer computational resources than loading and/or viewing one or more entire files.

In accordance with various arrangements, example methods and computer program products are disclosed herein. It is understood however, that these arrangements are presented by way of example and are not limited, and it will be apparent to those of ordinary skill in the art who read the present disclosure that various modifications to the disclosed arrangements can be made while remaining with the scope of this disclosure.

Disclosed herein are systems and methods related to simultaneously viewing and modifying multiple segments of one or more files. Some arrangements are related to a method for multi-segment display comprising: searching, by a processor, a string of characters in one or more files; responsive to identifying the string in a subset of files of the one or more files, defining, by the processor, one or more file segments based on a byte position of the string in each of the files of the subset of files; and displaying, by the processor, at least one file segment to a user, the displayed file segment being readable and writable.

Identifying the string in the subset of files of the one or more files comprises matching a portion of the searched string to a portion of a string in a file of the one or more files. The file segment may be based on a start position of a line of data and an end position of the line of data, the line of data including the byte position of the string. The byte position of the string may comprise a position of a first character of the string in a file of the one or more files. The method may further include displaying, by the processor, at least two file segments originating from a single file of the subset of files. The method may further comprise displaying, by the processor, a first file segment originating from a first file and a second file segment originating from a second file.

The method may further include receiving, by the processor, a user modification of one or more characters to one or more characters of the at least one file segment; and indicating, by the processor, that one or more characters of the at least one file segment have been modified. The method may further include updating, by the processor, a start position of the line of data or an end position of the line of data of the at least one file segment based on a size of the user modification. The method may further include updating, by the processor, a start position of a second line of data or an end position of the second line of data of another file segment based on the updated start position of the line of data or the updated end position of the line of data of the at least one file segment. The method may further include updating, by the processor, a file corresponding to the at least one file segment based on the user modification of one or more characters of the at least one file segment. The method may further include excluding, by the processor, from displaying another file segment of the subset of files to the user based on a classification of one or more characters of the another file segment.

Other arrangements are related to a system including a memory; and one or more processors coupled to the memory configured to: search a string of characters in one or more files; responsive to identifying the string in a subset of files of the one or more files, define one or more file segments based on a byte position of the string in each of the files of the subset of files; and display at least one file segment to a user, the displayed file segment being readable and writable.

In some arrangements, identifying the string in the subset of files of the one or more files comprises matching a portion of the searched string to a portion of a string in a file of the one or more files. The file segment may be based on a start position of a line of data and an end position of the line of data, the line of data including the byte position of the string. The byte position of the string may comprise a position of a first character of the string in a file of the one or more files. The one or more processors may further be configured to: display at least two file segments originating from a single file of the subset of files. The one or more processors may be further configured to: display a first file segment originating from a first file and a second file segment originating from a second file.

The one or more processors may be further configured to: receive a user modification of one or more characters to one or more characters of the at least one file segment; and indicate that one or more characters of the at least one file segment have been modified. The one or more processors may be further configured to: update a start position of the line of data or an end position of the line of data of the at least one file segment based on a size of the user modification.

Other arrangements are related to a non-transitory processor-readable medium containing processor-readable instructions, such that, when executed by one or more processors, causes the one or more processors to: search a string of characters in one or more files; responsive to identifying the string in a subset of files of the one or more files, define one or more file segments based on a byte position of the string in each of the files of the subset of files;

and display at least one file segment to a user, the displayed file segment being readable and writable.

The above and other aspects and their implementations are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 9 is example code designed to write back/flush/update the file responsive to the file segment being edited by the user, according to some arrangements.

DETAILED DESCRIPTION OF THE DRAWINGS

Figure 1:
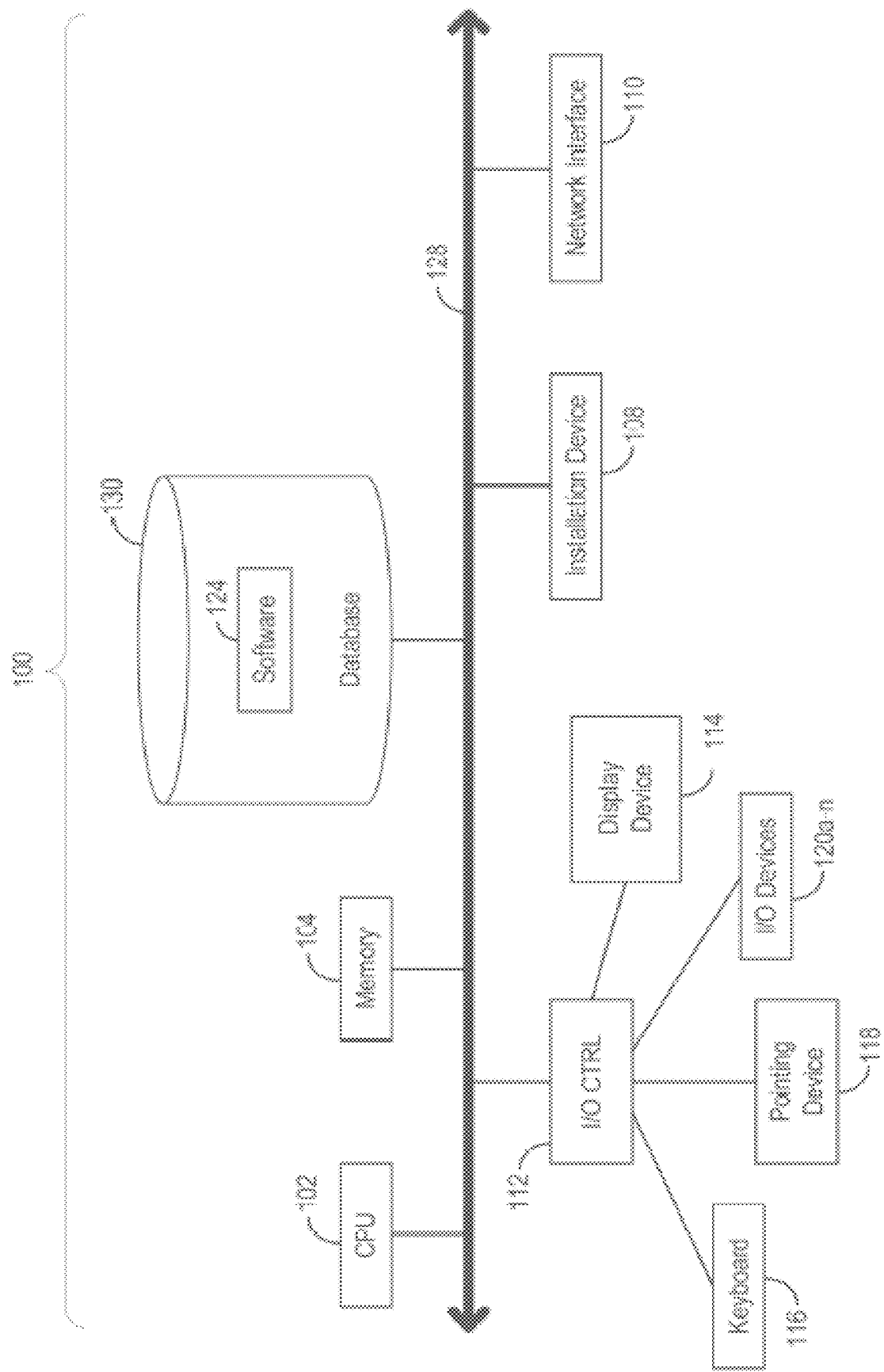
FIG. 1 is a generalized block diagram depicting a computing system capable of loading one or more segments of one or more files for read/write access, according to some arrangements.

Hereinafter, example arrangements will be described in more detail with reference to the accompanying drawings, in which like reference numbers refer to like elements throughout. The present disclosure, however, can be embodied in various different forms, and should not be construed as being limited to only the illustrated arrangements herein. Rather, these arrangements are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description.

There are different mechanisms in which computer programs view and/or modify data content of one or more files. Conventionally, some computing programs overlay a window (or segment) on top of a single loaded (e.g., editable) file. In these cases, the programs may open/load the single entire file for read/write access and simultaneously display a second file in the window for viewing (e.g., reading). Additionally or alternatively, some programs may open/load/modify a segment of the single file (as opposed to the entire file). However, in order for the program to view file data outside of the segment of the file, the program may re-read the entire file and re-calculate data within the segment and/or recreate the segment entirely such that the new data is accessible within the segment. By reading/loading the entire file, these programs may consume computational resources that increase performance delays experienced by the user. These programs do not employ a multi-segment solution that concurrently opens multiple segments of one or more files for both read and write access.

Other programs may provide read access to one or more files (or segments), but in order to write to the one or more files (or segments), the files must be opened separately and individually in their entirety. For example, a program may provide a "Search in Files" feature whereby a user can specifically search for a string of characters (e.g., a keyword, a phrase). The read-only search displays a set of results of files containing the string of characters. In some instances, the program may show the relevant portion(s) of the file containing the searched-for string of characters. However, in order to modify the files/segments of files, the user must open each file individually and in its entirety, locate the area of interest in the file, make the changes, save the changes, and close the file. This approach consumes significant computational resources. Accordingly, these programs do not concurrently open multiple segments of one or more files for read/write access.

In some arrangements, a user may write a script to automatically modify files based on criteria. However, this scripting approach does not afford the user the opportunity to review, adjust and confirm changes to text before the script writes the data out to the file(s). Accordingly, the user cannot read the files as the changes are implemented. Thus, there is an increased level of risk when designing a script to automatically modify files.

The present disclosure relates generally to accessing and/or editing multiple portions/segments of one or more files at once (simultaneously, concurrently). The user can view and edit search results in a manner that reduces the computational resource consumption using a multi-segment solution. Such accessing and/or editing one or more portions/segments of one or more files may be beneficial in text editing applications, code editing applications, web development applications, system administration, file comparison applications, programming development applications, database dumps, data logs, etc. In the case of large files, rather than load the entire file into a program (e.g., an editor) and incurring a high computational resource cost and/or exceeding the program's capabilities, one or more smaller file segments of the same file may be loaded by the program for display and/or modification. Additionally or alternatively, in the case of multiple files, rather than load the entirety of each file into the program, incurring a high computational resource cost and/or exceeding the program's capabilities, one or more smaller file segments of each of the multiple files may be loaded by the program for display and/or modification. Loading one or more file segments of one or more files for viewing and/or modifications is a multi-segment solution that reduces performance issues associated with accessing data/files in different locations (e.g., files stored remotely, files stored locally). Moreover, loading one or more file segments of one or more files for viewing and/or modification may reduce performance issues associated with loading large files that may exceed program capabilities. In a particular example, loading multiple files segments of multiple files may conserve computing resources in such cases where, for example, the modification to the files is quick and/or localized to specific segments of the files. In these cases, loading multiple files in their entirety may consume more resources than performing the modification to the file(s) (or the segments of the files).

The above information disclosed in this Background section is for enhancement of understanding of the background of the disclosure, and therefore, it can contain information that does not constitute prior art.

FIG. 1 is a generalized block diagram depicting a computing system 100 capable of loading one or more segments of one or more files for read/write access, according to some arrangements. As shown in FIG. 1, in some examples, the computing system 100 includes a central processing unit (CPU) 102, a memory unit 104, a database 130, an installation device 108, a network interface 110, an input/output (I/O) controller 112, a display device 114, a keyboard 116, a pointing device 118 (e.g., a mouse), and so on. The database 130 can include, without limitation, software 124. The computing system 100 can also include additional elements such as but not limited to a memory port, a bridge, one or more input/output devices 120 (e.g., 120a-120n), cache memory in communication with the CPU 102, and so on.

In some examples, the CPU 102 can be any suitable logic circuitry that responds to and processes instructions fetched from the memory unit 104. In some examples, the CPU 102 is provided by a microprocessor unit. For example, in some examples, the microprocessor unit can include one or more microprocessors or any other suitable processor capable of operating as described herein. In various examples, the CPU 102 can utilize instruction level parallelism, thread level parallelism, different levels of cache, and/or multi-core processors. A multi-core processor can include two or more processing units on a single computing component.

In some examples, the memory unit 104 can include one or more memory chips capable of storing data and allowing any storage location to be directly accessed by the CPU 102. In various examples, the memory unit 104 can be Dynamic Random Access Memory (DRAM) or any variants, including Static Random Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), Extreme Data Rate DRAM (XDR DRAM), and so on. In some examples, the memory unit 104 and/or the database 130 can be non-volatile memory such as but not limited to, a Non-Volatile Read Access Memory (NVRAM), Flash Memory Non-Volatile Static RAM (nvSRAM), Ferroelectric RAM (FeRAM), Magnetoresistive RAM (MRAM), Phase-Change Memory (PRAM), Conductive-Bridging RAM (CBRAM), Silicon-Oxide-Nitride-Oxide-Silicon (SONOS), Resistive RAM (RRAM), Racetrack, Nano-RAM (NRAM), Millipede memory, and so on. The memory unit 104 can be based on any of the above-described memory devices, or any other available memory chips capable of operating as described herein. In some examples, the CPU 102 communicates with the memory unit 104 via a system bus 128. In other examples, the CPU 102 can communicate directly with the memory unit 104 via a memory port.

In some examples, the CPU 102 can communicate directly with cache memory via a secondary bus, sometimes referred to as a backside bus. In other examples, the CPU 102 can communicate with cache memory using the system bus 128. Cache memory typically has a faster response time than the memory unit 104, and is typically provided by SRAM, BSRAM, or EDRAM. In some examples, the CPU 102 communicates with various I/O devices 120 via a local system bus (e.g., the system bus 128). Various buses can be used to connect the CPU 102 to any of the I/O devices 120, including a PCI bus, a PCI-X bus, or a PCI-Express bus, or a NuBus. In examples in which the I/O devices 120 include the display device 114, the CPU 102 can use an Accelerated Graphics Port (AGP) to communicate with the display device 114 or the I/O controller 112 for the display device 114.

Various software programs can be executed by the CPU 102 and/or remote device (e.g., cloud computing devices such as servers or any other suitable computing device that can access the computing device 100 over a network via the network interface 110). In some arrangements, the software executed may be part of a software development environment to facilitate software developers in building software applications for operations systems. For example, software may be executed as part of an integrated development environment (IDE). In other examples, software may be executed as a separate tool for text editing (e.g., read, write, and edit the text of a computer application, web service for the computer application, or any other suitable computer program). In a particular example, the software may be a tool that facilitates the development of web services for various computer applications (e.g., client applications, desktop applications, mobile applications, and/or the like) for various computer programs, applications, operating systems, devices, and/or interfaces.

In some examples, the database 130 (e.g., residing on one or more hard disk drives or redundant arrays of independent disks) can store related software (e.g., the software 124). The software 124 can be executed by the CPU 102 in order to load, display, and/or modify one or more segments of one or more files stored in the database 130. Thus, while the software 124 is shown to be implemented as part of the database 130, the software 124 can be executed by the CPU 102 and stored in the memory 104.

In various examples, a wide variety of I/O devices 120a-120n can be included in the computing system 100. For example, in various examples, the input devices of the I/O devices 120a-120n can include but are not limited to keyboards, mice, trackpads, trackballs, touchpads, touch mice, multi-touch touchpads and touch mice, microphones, multi-array microphones, drawing tablets, and/or other sensors. In various examples, the output devices of the I/O devices 120a-120n can include, for example, video displays, graphical displays, speakers, headphones, inkjet printers, laser printers, and/or 3D printers. In some examples, I/O devices 120a-120n can include a combination of multiple input or output devices.

In some examples, addition I/O devices 120a-120n can have both input and output capabilities, including, but not limited to for example, touchscreen displays, multi-touch displays, and/or the like. Touchscreen, multi-touch displays, touchpads, touch mice, or other touch sensing devices can use different technologies to sense touch, including, for example, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), force-based sensing technologies, and/or the like. Some multi-touch devices can allow two or more contact points with the surface, allowing advanced functionality including, for example, pinch, spread, rotate, scroll, and/or other gestures. In some examples, some of the I/O devices 120a-120n, display devices 114a-114n, or group of devices can be augment reality devices. In some examples, the I/O devices (e.g., keyboard 116, pointing device 118, display devices 114, and/or I/O devices 120) can be controlled by the I/O controller 112. In some examples, an I/O device can also provide storage and/or an installation medium (e.g., installation device 108) for the computing system 100. In still other examples, the computing system 100 can provide USB connections to receive handheld USB storage devices. In further examples, an I/O device 120 can be a bridge between the system bus 128 and an external communication bus, for example, such as a USB bus, a SCSI bus, a FireWire bus, an Ethernet bus, a Gigabit Ethernet bus, a Fibre Channel bus, a Thunderbolt bus, and/or the like.

In some examples, the display devices 114a-114n can be connected to the I/O controller 112. In various examples, the display devices 114a-114n can include any suitable electronic display device including, but not limited to, a liquid crystal display (LCD), a thin film transistor LCD (TFT-LCD), a blue phase LCD, an electronic papers (e-ink) display, a flexible display, a light emitting diode display (LED), a digital light processing (DLP) display, a liquid crystal on silicon (LCOS) display, an organic light-emitting diode (OLED) display, an active-matrix organic light-emitting diode (AMOLED) display, a liquid crystal laser display, a time-multiplexed optical shutter (TMOS) display, a 3D or stereoscopic display, and/or the like. Examples of 3D displays can include, for example, stereoscopy, polarization filters, active shutters, autostereoscopy, and/or the like. Display devices 114a-114n can also include a head-mounted display (HMD). In some examples, display devices 114a-114n or the corresponding I/O controllers 112 can be controlled through or have hardware support for OPENGL, DIRECTX API, and/or other graphics libraries.

Examples of hardware implementing the database 130 can include, but is not limited to, hard disk drive (HDD), optical drive including CD drive, solid-state drive (SSD), USB flash drive, and/or any other suitable device for storing data. In one example, the database 130 can be implemented using multiple volatile and non-volatile memories such as but not limited to, solid state hybrid drives that combine hard disks with solid state cache. In one example, the database 130 can be implemented on non-volatile, mutable, and/or read-only. In some examples, hardware implementing the database 130 is internal to the computing system 100 and can connect to other components of the computing system 100 via the bus 128. In some examples, one or more storage devices (not shown) implementing the database 130 are external to the computing system 100 and can be connect to the computing system 100 via an external bus of the I/O devices 120a-n. In some examples, the database 130 connects to the computing system 100 via the network interface 110 over a network. For instance, the database 130 connects to the computing system 100 in a distributed computing environment, such as a cloud environment.

In some examples, the computing system 100 can include the network interface 110 to interface to a network through a variety of connections including, but not limited to, for example, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, and/or some combination of any or all of the above. Connections can be established using a variety of communication protocols (such as, but not limited to TCP/IP, Ethernet, ARCNET, SONET, SDH, Fiber Distributed Data Interface (FDDI), IEEE 802.11/b/g/n/ac CDMA, GSM, WiMax and direct asynchronous connections). In one example, the computing system 100 communicates with other computing devices via any type and/or form of gateway or tunneling protocol (e.g. Secure Socket Layer (SSL) or Transport Layer Security (TLS)). In some examples, the network interface 110 can include, for example, a built-in network adapter, network interface card, PCMCIA network card, EXPRESSCARD network card, card bus network adapter, wireless network adapter, USB network adapter, modem, and/or any other suitable device for interfacing the computing system 100 to any type of network capable of communication and performing the operations described herein.

In various examples, the computing system 100 can be any workstation, desktop computer, laptop or notebook computer, tablet, server, handheld computer, mobile telephone, smartphone or other portable telecommunications device, media playing device, a gaming system, mobile computing device, and/or any other suitable type and/or form of computing, telecommunications, or media device that is capable of communication.

While some non-limiting examples of various computing devices of the system 100 and components thereof have been described herein, the present disclosure is not limited to. For example, other suitable computing devices and/or components thereof relating to one or more of the various aspects of the operating environments and components described above in the context of the systems and methods disclosed herein are contemplated, as will be apparent to those having ordinary skill in the art.

Figure 2:
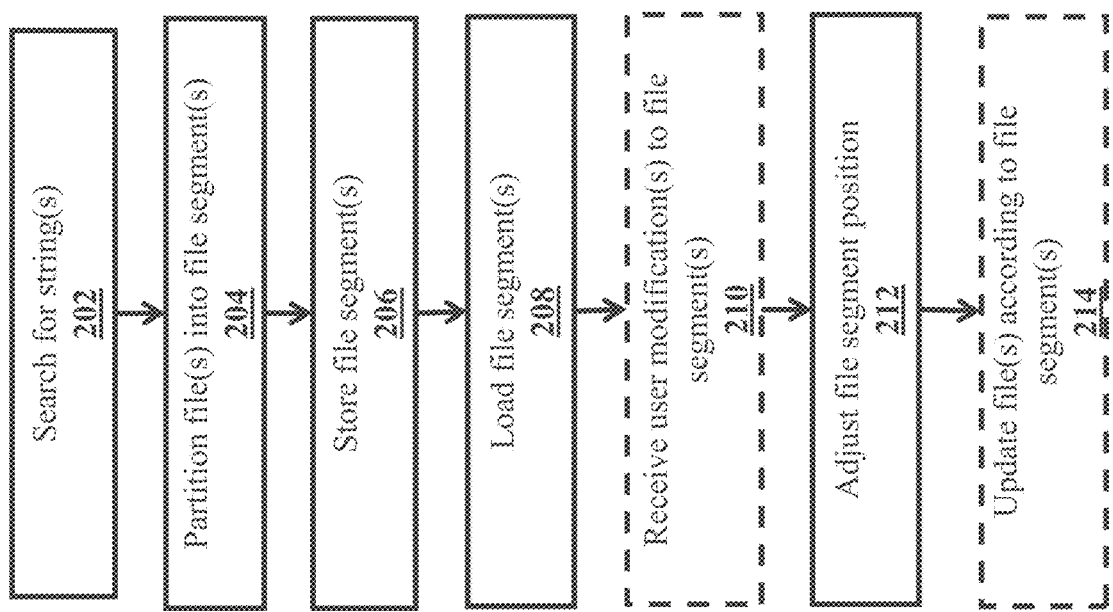
FIG. 2 is a flow diagram illustrating an example method for viewing and/or modifying text of one or more files, according to some arrangements.

FIG. 2 is a flow diagram illustrating an example method 200 for viewing and/or modifying text of one or more files, according to some arrangements. Referring to FIGS. 1-2, the method 200 can be performed by the software 124 and/or the CPU 102, referred to generally as the system 100.

At 202, the system 100 may receive a query to search for occurrence(s) of string(s) of characters in one or more files. A user operating the system 100 may define the string of characters and one or more searching preferences using the keyboard 116, pointing device 118 and/or I/O devices 120a-n. The string of characters to be searched may be searched in any type of file. In an example, the system 100 may search for the string of characters in a plain text file in HTML, Javascript, PHP, and/or other common programming languages. In other examples, the system 100 may search for strings of characters in formatted data (e.g., data interpreted/formatted according to one or more applications/programs) and display the raw contents of the data (e.g., binary data). In other examples, the system 100 may search for strings of characters in formatted data and display the interpreted/formatted data (e.g., a document formatted in a particular application may be displayed by the system 100 and/or interrupted by the system 100 to appear similarly formatted for edits/view). In these instances, the system 100 may call one or more other applications (e.g., Microsoft Word™) to interpret the formatted content of a file. Additionally or alternatively, the system 100 may interpret the content of the file without calling one or more other applications. In yet other examples, the system 100 may not search for strings of characters in file types that interpret/format data (e.g., Microsoft Word™, Adobe PDF™).

The system 100 may search for strings in one or more files retrieved from database 130, files stored in memory 104, and/or a file retrieved remotely from a network via network interface 110. In an example, a file may be loaded into memory 104 from a remote server (or other external computing device). The loaded file may be a local copy of the remote file. The local copy of the remote file may be included in the search of the user-entered string. In other implementations, the file may be stored in memory on one or more remote computing devices. The remotely stored file may be included in the search for the user-entered string responsive to the system 100 querying the remote computing devices for the user-entered string.

Figure 3:
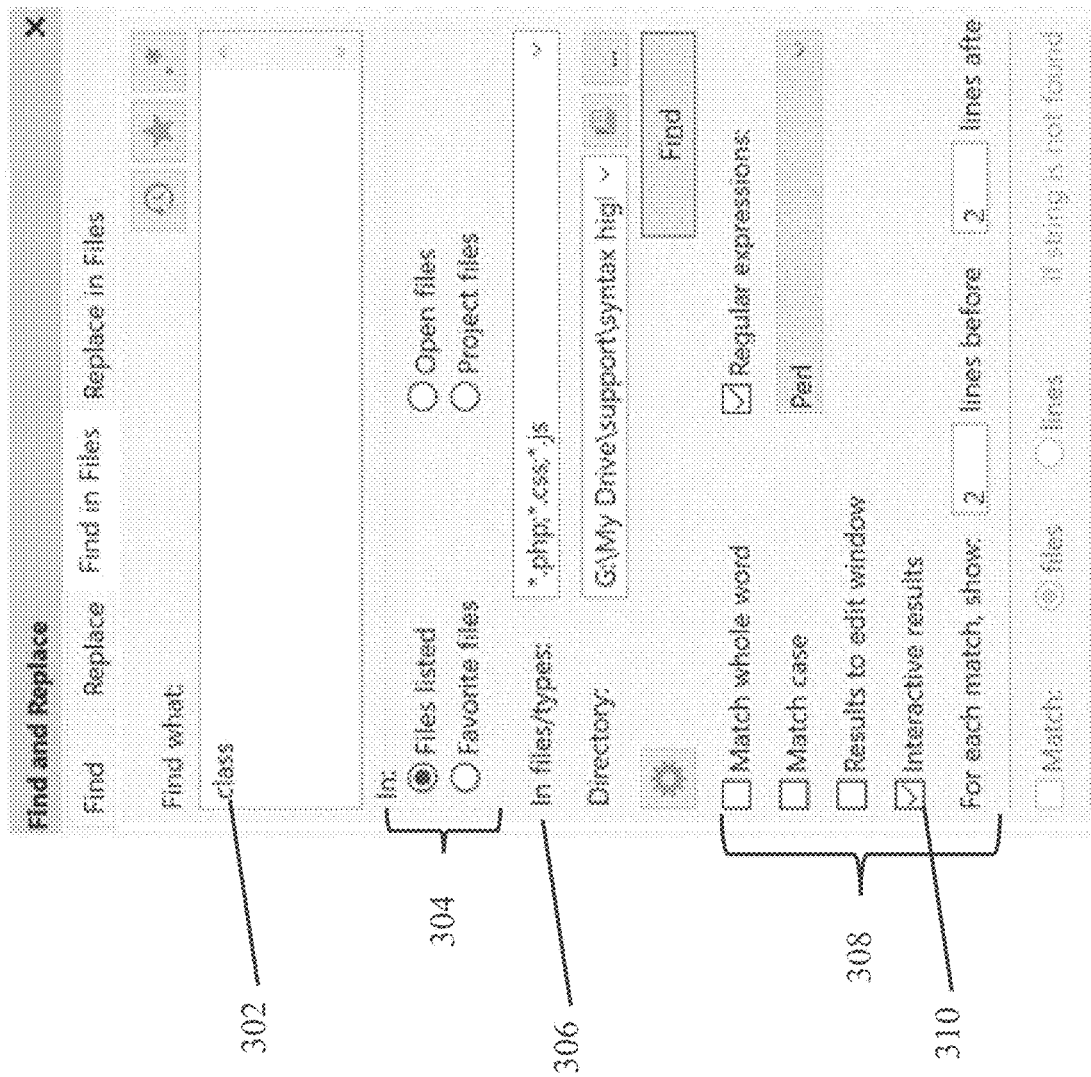
FIG. 3 is an example search window configured by the system to receive a user search for a string of characters and/or user preferences, according to some arrangements.

Referring to FIG. 3, illustrated is an example search window configured by the system 100 to receive a user search for a string of characters and/or user preferences, according to some arrangements.

As shown in field 302, the system 100 may display the string of characters to be searched. The system 100 may receive the string of characters from the user via keyboard 116 (e.g., the user may type the string of characters to be searched), pointing device 118 (e.g., the user may click or otherwise interact with a string of characters to be searched), and/or I/O devices 120*a-n* (e.g., the user may speak the string of characters to be searched into a microphone that converts the audio signal into digital content using any suitable natural language processing algorithm, the user may gesture a string of characters to be searched into a camera that predicts the string of characters to be searched using any suitable object detection/object recognition algorithms and/or one or more machine learning models trained to receive an image and output a corresponding character (or string of characters)).

As shown in field 304, the system 100 may display one or more interactive buttons. The user may indicate how and/or where the system 100 is to search for the string of characters defined in field 302. For example, the user may indicate that the system 100 search for the string of characters in a particular list of files and/or a particular list of projects. For example, the user may define a list of files to be searched and/or a list of favorite files. In other arrangements, the system 100 may determine one or more lists of files to be searched. For instance, the system 100 may determine a list of files based on the user's recently accessed files. In this implementation, the system 100 may generate a list of files to be searched according to files accessed (opened, loaded, viewed, etc.) in a predetermined period of time (e.g., files accessed in a particular hour, files access the last day, files accessed the last week), files communicated to the user (e.g., files sent to the user via email or other application), and/or the like. The user may also indicate that the system 100 search for the string of characters in open files. As discussed herein, the files to be searched may be files stored locally, local copies of files stored remotely, and/or files stored remotely.

As shown in field 306, the system 100 may display one or more file types to be searched. The user may indicate particular file types using the keyboard 116, the pointing device 118 and/or I/O devices 120*a-n*.

As shown in field 308, the system 100 may display one or more searching parameters. The user may select (or otherwise interact with) searching parameters that restrict (or narrow) the search of the string performed by the system 100. Searching parameters may include searching for a portion of the string of characters (or searching for the entire string of characters), matching the case of the string of characters, displaying content around the searched-for string of characters, and the like. The user may indicate one or more searching parameters using the keyboard 116, the pointing device 118 and/or I/O devices 120*a-n*.

Figure 5:
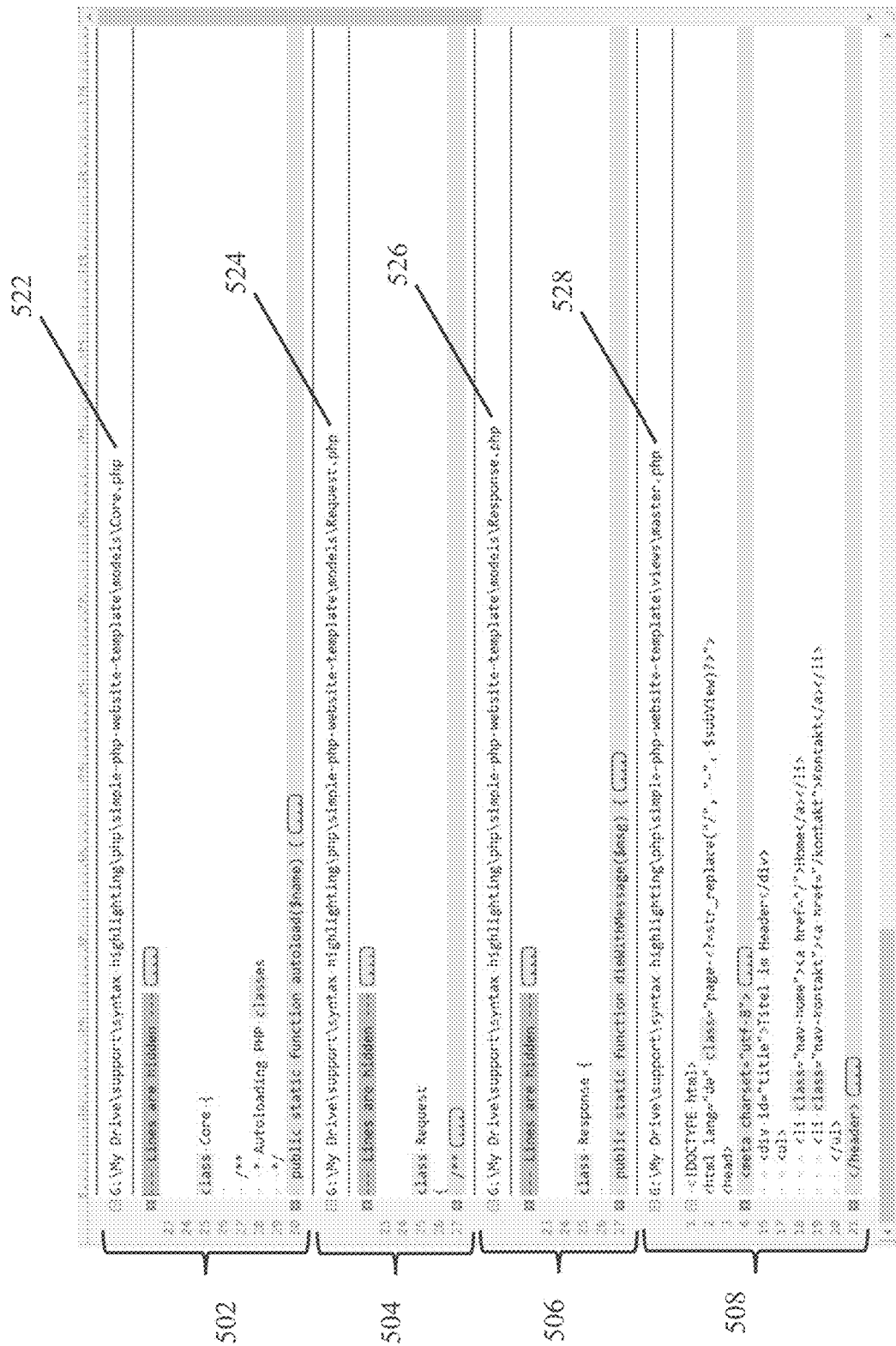
FIG. 5 is an example of displayed file segments of multiple files, according to some arrangements.

In some arrangements, one particular search parameter of field 308 is interactive button 310. In the event the user interacts with interactive button 310, the system 100 may launch interactive results. Launching interactive results may include presenting the user with the ability to view and/or edit one or more file segments of one or more files. An example of launched interactive results is illustrated in FIG. 5. As described herein, the system 100 may display all of the results (or a portion of the result) of the search request in a segment (e.g., a displayed segment of a file) to be viewed and/or edited by the user. It should be appreciated that the interactive button 310 (the name of the interactive button and the manner of interacting with the interactive button) may be different in other arrangements.

Referring back to FIG. 2, at 204, the system 100 partitions files that contain the searched string(s) into file segments. The system 100 may identify that the file contains the searched string(s) using the searching parameters. For example, the system 100 may match one or more portions of the searched string to one or more portions of strings in a file. The system 100 partitions one or more files into file one or more file segments based on predetermined file segment boundaries. For example, the system 100 may be preconfigured to partition a file into a file segment, where the start of the file segment begins at the start of a line of data that includes the searched-for string, and the end of the file segment ends at the end of the line of data that includes the searched-for string. In a particular example, a file may be 100 megabytes long. A line of the file may start at byte position 55. Moreover, the system 100 may identify a searched-for string at byte position 55. The searched-for string being at byte position 55 may indicate that a first character of the searched-for string begins at byte position 55 of the file. The system 100 may define a file segment associated with the searched-for string from byte position 55 (e.g., the start of the line containing the searched-for string) to the end of the line (e.g., byte position 255, the end of the line containing the searched-for string). The byte position may be a position in a file corresponding to a certain position of a line/character/string/in the file. The system 100 may also define the file segment using portions of the line of data (instead of the entire line) that include the searched-for string.

In some arrangements, the system 100 may identify the searched-for string in a portion of a file that is classified by a user. The user may input a classification (e.g., select text to be hidden from view) using the keyboard 116, the pointing device 118 and/or the I/O devices 120*a-n*. When the system 100 receives the classification of the one or more characters, the system 100 may set a flag in memory 104 (or otherwise indicate that a particular portion of the file has been flagged or otherwise classified according to a user preference). In some arrangements, the system 100 may forgo defining a file segment by partitioning the file including the classified data (and the searched-for string). In other arrangements, the system 100 may partition the file including the classified data (and the searched-for string) into a file segment. The system 100 may flag the file segment or otherwise differentiate the file segment from other file segments including the searched-for string.

Figure 4:
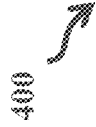
FIG. 4 is example code designed to store the file segment in memory, according to some arrangements.

At 206, the system 100 stores the file segments in memory 104. The system 100 may store the file segment as a file segment structure/class such that the system 100 tracks the starting and/or ending file positions of the file segment. The text data of the file (e.g., the searched-for string in the file) may be stored as an array of Unicode characters or other type of array. FIG. 4 illustrates example code 400 designed to store the file segment in memory 104, according to some arrangements.

Multiple parts of one or more files may be grouped into a class such as a File Document class. For example, a File Document class including file segments (of the same file or of different files) associated with one or more classifications may be grouped into a File Document class.

At 208, the system 100 loads one or more file segments of one or more files. Loading file segments means that the system 100 does not load entire file(s), improving the utilization of computational resources. The system 100 displays the loaded one or more file segments to the user, where each of the displayed file segments may include the occurrence(s) of the string(s) in one or more files. The system 100 may display the file segment(s) such that the file segments each file segment is displayed as single document. Additionally or alternatively, the system 100 may display the file segment(s) such that each file segment is displayed as multiple appended documents in a single document. In some arrangements, the content of the displayed file segments include the raw content of the file. For example, the system 100 may display un-interrupted data (raw data) such that formatting, font styles, and the like may not be displayed to the user. In other arrangements, the content of the displayed file may be interpreted by the system 100 such that the displayed file segments are formatted according to the originating application.

In some arrangements, the loaded file segments include all of the partitioned file segments. In other arrangements, the loaded file segments may be a subset of the partitioned file segments. For example, if the data in the file segment is classified (e.g., the user has indicated that the data in the file segment be hidden), the system 100 may not display/load the file segment. The system 100 may also load multiple File Documents classes.

Referring to FIG. 5, illustrated are displayed file segments of multiple files, according to some arrangements. In particular, FIG. 5 illustrates example search results retrieved by the system 100. As shown, segments 502-508 show occurrences of the string "class" that were retrieved by the system in four distinct documents. The location of each file in memory 104 is indicated by 522, 524, 526, and 528 respectively. In other arrangements, other identifiers/information associated with each file (e.g., the name, the date of last modification, the user who last modified the file, the user who created the file, etc.) may be displayed by the system 100. Each of the segments 502-508 (e.g., file segments, as discussed herein) are appended together such that the user is displayed a single window with four sub-segments (e.g., segment 502, segment 504, segment 506, and segment 508). In other arrangements, each segment 502-508 may each be displayed as a separate window/segment (e.g., as opposed to being appended to one another). The user may interact with each segment 502, segment 504, segment 506, and segment 508 to modify the text in the segment (file segment) and save the modified text of the file segment to the file.

Figure 6:
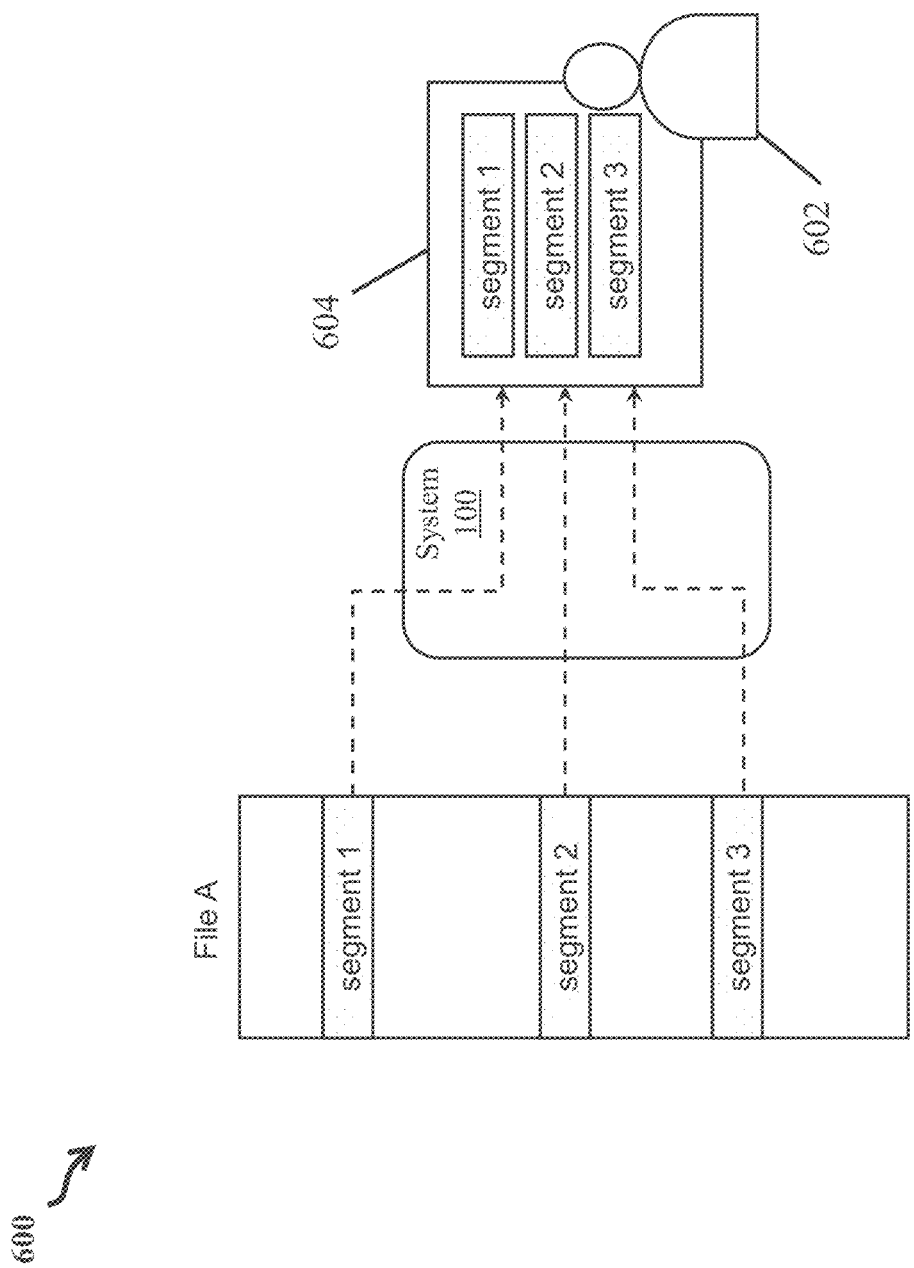
FIG. 6 is a generalized block diagram representation illustrating a user-entered string being identified in a single file multiple times and displayed to the user as a file segment, according to some arrangements.

FIG. 6 illustrates a generalized block diagram representation 600 of a user-entered string being identified in a single file multiple times and displayed to the user as file segments, according to some arrangements. FIG. 6 includes a user 602, a computing device 604, and the system 100. As discussed herein, File A may be stored in system 100 and/or stored externally (e.g., remotely).

As shown, the system 100 identifies the searched-for string (not shown) in three portions of File A (e.g., segment 1, segment 2, segment 3). The system 110 defines file segments by partitioning File A with respect to position of the searched-for string. The system 100 displays segments 1-3 to the user 602 via a computing device 604, where each of the displayed segments 1-3 originate from File A. The user may modify the file segments (segments 1-3) rather than modifying (and loading) File A in its entirety.

It should be appreciated that the user 602 may change each of the text in segments 1-3 in different ways. In an example implementation, File A may be code that describes a call function. The user may search for a string associated with the call function, resulting in the system identifying and displaying file segments 1-3. In the example implementation, there may be an optional parameter of the function that in some contexts is helpful, and in other contexts, is not helpful. Accordingly, the user 602 may modify the parameter of the function (identified in segments 1-3) based on the context that the function is being used. As such, the modifications to each of the file segments (or a portion of the file segments) may be different from the other file segments. In other implementations, changes to each of the file segments (or a portion of the file segments) may be similar to those changes of other file segments.

Figure 7:
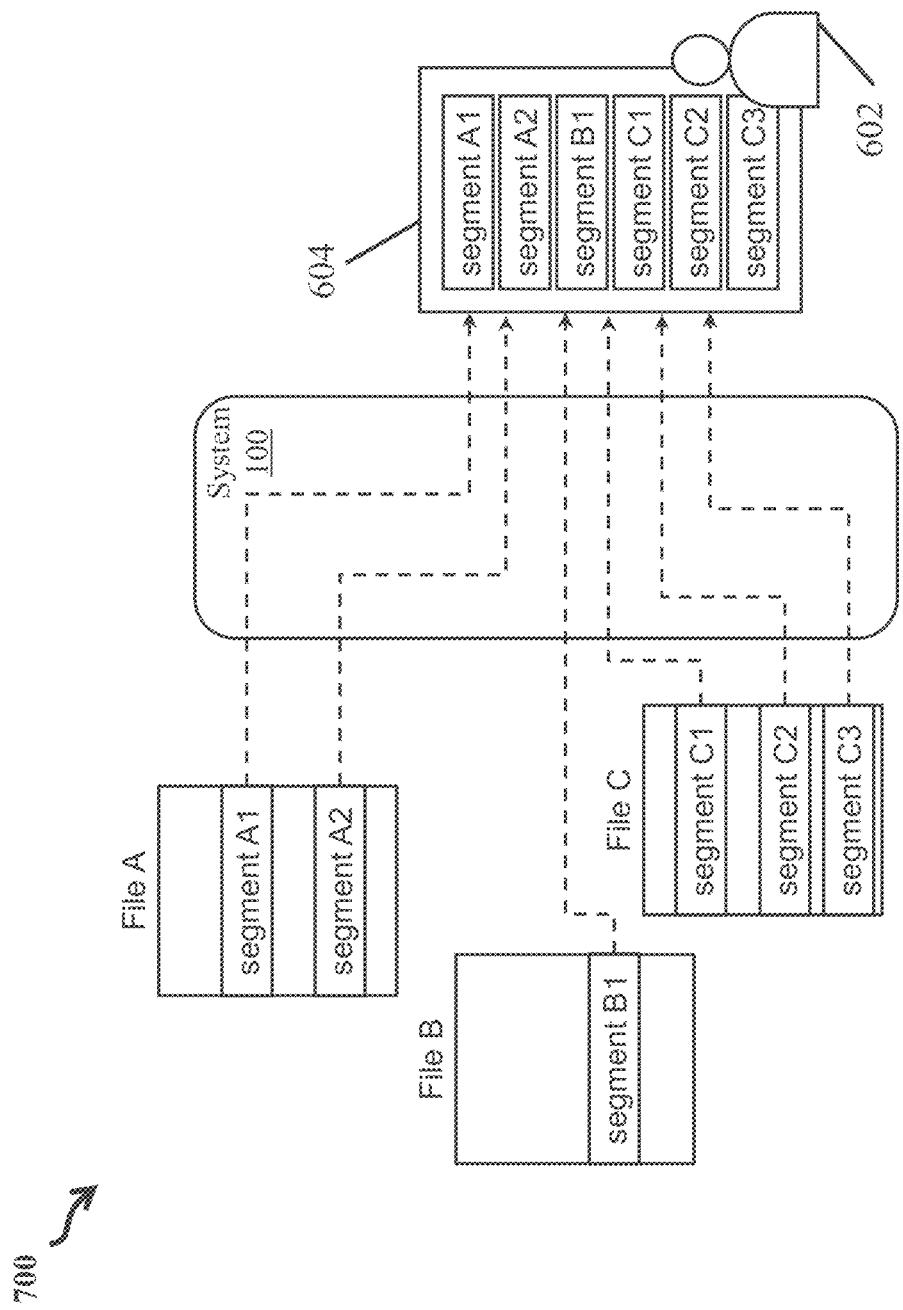
FIG. 7 is a generalized block diagram representation of a user-entered string being identified in multiple files multiple times and displayed to the user as file segments, according to some arrangements.

FIG. 7 illustrates a generalized block diagram representation 700 of a user-entered string being identified in multiple files multiple times and displayed to the user as file segments, according to some arrangements. FIG. 7 includes a user 602, a computing device 604, and the system 100. As discussed herein, Files A-C may be stored in system 100 and/or stored externally (e.g., remotely).

As shown, the system 100 identifies the string in two portions of File A (e.g., segment A1 and segment A2), one portion of File B (e.g., segment B1), and three portions of File C (e.g., segment C1, segment C2, and segment C3). The system defines file segments by partitioning each of the Files with respect to the position of the searched-for string. The system 110 displays multiple segments (e.g., segments A1 and A2, segment B1, and segments C1-C3) of multiple files (File A, File B and File C) to the user 602 simultaneously via computing device 604. User 602 may modify file segments (segments A1 and A2, segment B1, and segments C1-C3) rather than modifying (and loading Files A-C in their entirety) the Files A-C separately.

Referring back to FIG. 2, at optional 210, the system 100 receives edits from the user. In some cases, the user may not edit the file segment (e.g., the user views the loaded/displayed file segments at 208). In other cases, the user may edit the file segment (e.g., the flow diagram proceeds to 210). For example, the user may add, delete, modify characters loaded in one or more file segments displayed to the user. Edits (or revisions/modifications) made to the file segment may be saved, reviewed, discarded, etc. and stored in memory 104 associated with the modified file segment. That is, the modifications to the file segments may be saved in temporary memory (as opposed to the memory associated with the file). In the event the user edits a file segment, the system 100 may raise a flag (or otherwise indicate that a file segment has been edited). For example, the system 100 may alter the 'text' member of the File Segment class and set a 'modified' flag. The system 100 may update the file segment stored in memory 104. The system 100 may receive one or more changes of one or more file segments of one or more files at any given time.

Additionally or alternatively, the user may navigate the file segment (e.g., scroll through the file segment) and consume information around the searched-for string of characters. Accordingly, the system 100 may display contextual information (e.g., information/data surrounding the searched string) by facilitating the user navigating portions of the file segment.

If the user modifies the file segment (e.g., adds, deletes, modifies text), then the size of the file segment may be adjusted. The modifications to the file segment may shrink or expand the file segment. For example, a user may add characters to the file segment such that 2 bytes of data are added to the file segment. At 212, the system 100 adjusts the file segment position (e.g., the boundary of the file segment). The system 100 tracks the file position delta such that positions of other file segments of the same file remain consistent. The system 100 isolates the changes of each file segment by tracking the file position changes of each file segment resulting from the modification(s) to the file segment(s). The system 100 may update the file position of each file segment of the same file using the file position delta of any file segment of the file. The file position delta includes the file start and file end positions of the file segment following the modifications of the file segment. The system 100 tracks the cumulative file position deltas which are applied to the file segment and/or other file segments associated with the file. For example, a first file segment of a file may grow by 3 bytes, and a second file segment of the file may shrink by 10 bytes. The system 100 may propagate the file position deltas of each file segment of the file such that the file start position of each file segment is updated.

At optional 214, the system 100 updates one or more files according to one or more modified/edited file segments. In some cases, the user and/or system 100 may not flush (or update) the modifications made to the file segments of the file. For example, the user may determine not to update the file associated with the file segment at 210. In other cases, the user and/or system 100 may flush the modifications made to the file segments of the file (e.g., the flow diagram proceeds to 214). In some examples, the system updates (or flushes) files using updated file segments according to a user input (e.g., the user may press a 'save' button). In other examples, the system 100 may determine to update file(s) using updated file segment(s). For example, the system 100 may determine to update file(s) periodically, in response to one or more trigger conditions such as a closing/opening application, and the like.

The system 100 may update the file(s) at once (e.g., if the user presses a 'save' button). Additionally or alternatively, the system 100 updates file(s) sequentially (e.g., if the user modifies text of a first file segment and subsequently modifies text of a second file segment of the same file).

Figure 8:
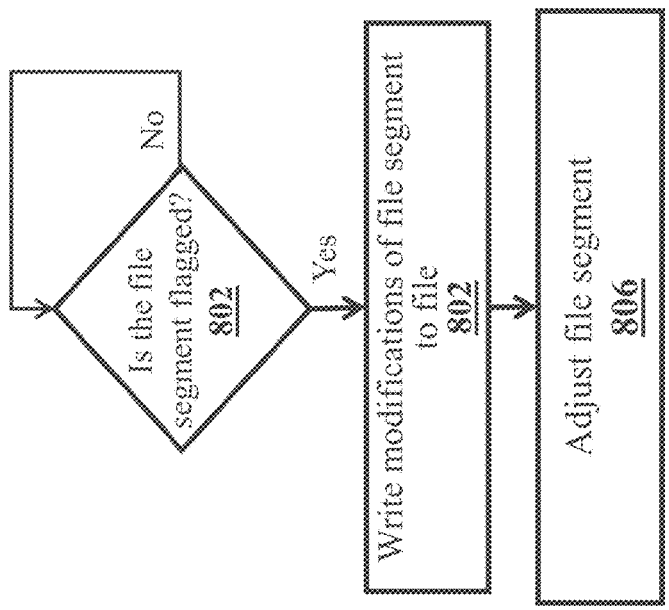
FIG. 8 is a flow diagram illustrating an example method for updating file(s) according to file segments, according to some arrangements.

FIG. 8 is a flow diagram illustrating an example method 800 for updating file(s) according to file segments, according to some arrangements. Referring to FIGS. 1-8, the method 800 can be performed by the software 124 and/or the CPU 102, referred to generally as the system 100.

The system 100 tracks the edited file segments according to flags (or other distinguishing factors) raised in response to user modifications to the file segments. At 802, the system 100 iterates through each file segment to determine whether a flag is set (or otherwise checks the file segment's modification state). If the system 100 determines that the file segment is not modified (e.g., the file segment is not flagged), then the system 100 may check a next file segment. If the system 100 determines that the file segment is modified, then at 804, the system 100 writes the modified text of the file segment back to the file. The system 100 may convert the Unicode text of the file segment to the file's native code page to write the modifications of the file segment back to the file. For example, the system 100 may replace the modified text of the line of the file segment with the corresponding line of the file in the file's native code. At 806, the system 100 adjusts the file segment. Once the file segment has been written back to the file, the system 100 adjusts the file start and file end positions of the file segment and clears the modified flag. FIG. 9 illustrates example code 900 designed to write back/flush/update the file responsive to the file segment being edited by the user, according to some arrangements. As described, in addition to converting the modifications of the file segment into the native code of the file, the system 100 updates the positions of the file segment start/end, and resets the flag indicating that the file segment has been updated.

While various arrangements of the present solution have been described above, it should be understood that they have been presented by way of example only, and not by way of limitation. Likewise, the various diagrams can depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which can be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the corresponding functions described herein. Additionally, for purpose of discussion, the various modules are described as discrete modules; however, as would be apparent to one of ordinary skill in the art, two or more modules can be combined to form a single module that performs the corresponding functions according arrangements of the present solution.

Additionally, memory or other storage, as well as communication components, can be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains can be used without detracting from the present solution. For example, functionality illustrated to be performed by separate processing logic elements, or controllers, can be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for multi-segment display comprising:
searching, by a processor, a string of characters in a plurality of files;
responsive to identifying the string in a subset of files of the plurality of files,
defining, by the processor, each of a plurality of file segments based at least in part on a byte position of the string in a file of the subset of files, wherein each of the plurality of file segments is from a respective one of the subset of files, and wherein each of the plurality of file segments comprises a segment string, the segment string comprises the searched string;
loading, by the processor, the plurality of file segments instead of entireties of the plurality of files; and
displaying, by the processor via a display device, the plurality of file segments to a user, the displayed plurality of file segments being readable and writable to the user.

2. The method of claim 1, further comprising matching a portion of the searched string to a portion of a string in a file of the plurality of files.

3. The method of claim 1, wherein each of the plurality of file segments is identified based at least in part on a start position of a line of data and an end position of the line of data, the line of data including the byte position of the string.

4. The method of claim 1, wherein the byte position of the string comprises a position of a first character of the string in a file of the plurality of files.

5. The method of claim 1, further comprising:
displaying, by the processor, a first file segment of the plurality of file segments originating from a first file of the plurality of files and a second file segment of the plurality of file segments originating from a second file of the plurality of files.

6. The method of claim 1, further comprising:
receiving, by the processor, a user modification of one or more characters of at least one file segment of the plurality of file segments; and
indicating, by the processor, that the one or more characters of the at least one file segment of the plurality of file segments have been modified.

7. The method of claim 6, further comprising: updating, by the processor, a start position of a line of data or an end position of the line of data of the at least one file segment of the plurality of file segments based at least in part on a size of the user modification.

8. The method of claim 7, further comprising: updating, by the processor, a start position of a second line of data or an end position of the second line of data of another file segment of the plurality of file segments based at least in part on the updated start position of the line of data or the updated end position of the line of data of the at least one file segment.

9. The method of claim 6, further comprising: updating, by the processor, a file of the plurality of files corresponding to the at least one file segment based at least in part on the user modification of one or more characters of the at least one file segment.

10. The method of claim 1, further comprising: excluding, by the processor, from displaying another file segment of the subset of files to the user based at least in part on a classification of one or more characters of the another file segment.

11. A system comprising:
a memory; and
one or more processors coupled to the memory configured to:
  search a string of characters in a plurality of files;
  responsive to identifying the string in a subset of files of the plurality of files,
    define each of a plurality of file segments based at least in part on a byte position of the string in a file of the subset of files, wherein each of the plurality of file segments is from a respective one of the subset of files, and wherein each of the plurality of file segments comprises a segment string, the segment string comprises the searched string;
    load the plurality of file segments instead of entireties of the plurality of files; and
    display, via a display device, the plurality of file segments to a user, the displayed plurality of file segments being readable and writable to the user.

12. The system of claim 11, wherein the one or more processors configured to match a portion of the searched string to a portion of a string in a file of the plurality of files.

13. The system of claim 11, wherein each of the plurality of file segments is identified based at least in part on a start position of a line of data and an end position of the line of data, the line of data including the byte position of the string.

14. The system of claim 11, wherein the byte position of the string comprises a position of a first character of the string in a file of the plurality of files.

15. The system of claim 11, wherein the one or more processors are further configured to: display a first file segment of the plurality of file segments originating from a first file of the plurality of files and a second file segment of the plurality of file segments originating from a second file of the plurality of files.

16. The system of claim 11, wherein the one or more processors are further configured to:
  receive a user modification of one or more characters of at least one file segment of the plurality of file segments; and
  indicate that one or more characters of the at least one file segment of the plurality of file segments have been modified.

17. The system of claim 16, wherein the one or more processors are further configured to: update a start position of a line of data or an end position of the line of data of the at least one file segment of the plurality of file segments based at least in part on a size of the user modification.

18. A non-transitory processor-readable medium containing processor-readable instructions, such that, when executed by one or more processors, causes the one or more processors to:
  search a string of characters in a plurality of files;
  responsive to identifying the string in a subset of files of the plurality of files,
    define each of a plurality of file segments based least in part on a byte position of the string in a file of the subset of files, and wherein each of the plurality of file segments comprises a segment string, the segment string comprises the searched string;
    load the plurality of file segments instead of entireties of the plurality of files; and
    display via a display device the plurality of file segments to a user, the displayed plurality of file segments being readable and writable to the user.

* * * * *